United States Patent
Al-Majnouni et al.

(10) Patent No.: US 12,473,499 B2
(45) Date of Patent: Nov. 18, 2025

(54) LIGHT OLEFINS YIELD IMPROVEMENT OVER LIGHT OLEFIN SELECTIVE CATALYST

(71) Applicant: SABIC Global Technologies B.V., Bergen op Zoom (NL)

(72) Inventors: Khalid A. Al-Majnouni, Riyadh (SA); Wojciech Supronowicz, Riyadh (SA); Nabil Al-Yassir, Riyadh (SA); Talal Aldugman, Riyadh (SA); Ahmed Alzenaidi, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 211 days.

(21) Appl. No.: 17/995,783

(22) PCT Filed: Mar. 22, 2021

(86) PCT No.: PCT/IB2021/052369
§ 371 (c)(1),
(2) Date: Oct. 7, 2022

(87) PCT Pub. No.: WO2021/214568
PCT Pub. Date: Oct. 28, 2021

(65) Prior Publication Data
US 2023/0167368 A1    Jun. 1, 2023

Related U.S. Application Data (60) Provisional application No. 63/013,477, filed on Apr. 21, 2020.

(51) Int. Cl.
*C10G 11/05*    (2006.01)
*B01J 29/08*    (2006.01)
(Continued)

(52) U.S. Cl.
CPC ............ *C10G 11/182* (2013.01); *B01J 29/08* (2013.01); *B01J 29/40* (2013.01); *C10G 11/05* (2013.01);
(Continued)

(58) Field of Classification Search
None
See application file for complete search history.

(56) References Cited

U.S. PATENT DOCUMENTS

| 4,432,863 A | 2/1984 | Myers et al. |
|---|---|---|
| 4,830,728 A | 5/1989 | Herbst et al. |

(Continued)

FOREIGN PATENT DOCUMENTS

| CN | 1259161 | 7/2000 |
|---|---|---|
| CN | 1380898 | 11/2002 |

(Continued)

OTHER PUBLICATIONS

Corma et al., "Light cracked naphtha processing: Controlling chemistry for maximum propylene production" *Catalysis Today* 2005, vol. 107-108, 699-706.

(Continued)

*Primary Examiner* — Tam M Nguyen
(74) *Attorney, Agent, or Firm* — Norton Rose Fulbright US LLP (57) ABSTRACT

Systems and methods for producing light olefin(s) are disclosed. The method includes contacting a catalyst with a coke precursor to form a light olefin selective catalyst, and contacting the light olefin selective catalyst with a hydrocarbon feed under conditions sufficient to catalytically crack at least a portion of the hydrocarbon feed to form a products stream containing a light olefin, here the light olefin selec- (Continued)

tive catalyst is more selective than the catalyst in catalyzing formation of the light olefin by the catalytic cracking of the hydrocarbon feed.

17 Claims, 5 Drawing Sheets (51) Int. Cl.
*B01J 29/40* (2006.01)
*C10G 11/14* (2006.01)
*C10G 11/18* (2006.01)

(52) U.S. Cl.
CPC ............... *C10G 2300/1033* (2013.01); *C10G 2300/708* (2013.01); *C10G 2400/20* (2013.01)

(56) References Cited

U.S. PATENT DOCUMENTS

| | | | | |
|---|---|---|---|---|
| 5,414,181 | A | * | 5/1995 | Bearden, Jr. ............ C10G 11/18 585/654 |
| 5,472,594 | A | * | 12/1995 | Tsang ..................... C10G 11/05 208/120.15 |
| 6,303,839 | B1 | | 10/2001 | Marker |
| 6,538,169 | B1 | | 3/2003 | Pittman et al. |
| 7,347,931 | B2 | | 3/2008 | Uzio et al. |
| 7,491,315 | B2 | | 2/2009 | Eng et al. |
| 8,293,961 | B2 | | 10/2012 | Choi et al. |
| 8,324,441 | B2 | | 12/2012 | Wegerer et al. |
| 9,745,519 | B2 | | 8/2017 | Niccum |
| 2005/0020867 | A1 | | 1/2005 | Xie et al. |
| 2018/0290948 | A1 | * | 10/2018 | Bunquin ............... B01J 37/0209 |
| 2019/0316042 | A1 | * | 10/2019 | Al-Majnouni ........ C10G 11/182 |
| 2020/0080006 | A1 | * | 3/2020 | Saravanan ............. C10G 11/16 |

FOREIGN PATENT DOCUMENTS

| | | | |
|---|---|---|---|
| CN | 1566268 | 1/2005 | |
| CN | 100554229 | 10/2009 | |
| EP | 0065627 | 12/1982 | |
| EP | 0583764 | 2/1994 | |
| EP | 2660288 | 11/2013 | |
| WO | WO-0190278 A2 * | 11/2001 | ........... C10G 51/023 |
| WO | WO 2006/098712 | 9/2006 | |
| WO | WO 2013/016660 | 1/2013 | |

OTHER PUBLICATIONS

International Search Report and Written Opinion issued in Corresponding PCT Application No. PCT/IB2021/052369, dated Jun. 17, 2021.

Office Action issued in corresponding Indian Application No. 202247060107, dated Dec. 15, 2022.

Office Action issued in corresponding Chinese Application No. 202180030275.8, dated Apr. 19, 2025. (English Translation provided).

* cited by examiner

LIGHT OLEFINS YIELD IMPROVEMENT OVER LIGHT OLEFIN SELECTIVE CATALYST

CROSS-REFERENCE TO RELATED APPLICATIONS

This application is a national phase under 35 U.S.C. § 371 of International Application No. PCT/IB2021/052369, filed Mar. 22, 2021, which claims the benefit of priority to U.S. Provisional Patent Application Ser. No. 63/013,477, filed Apr. 21, 2020, the entire contents of each of which are hereby incorporated by reference in their entirety.

FIELD OF INVENTION

The invention generally concerns systems and methods for producing light olefin(s). In particular, the invention concerns a method for producing light olefin(s) including contacting a catalyst with a coke precursor to form a light olefin selective catalyst and contacting the light olefin selective catalyst with a hydrocarbon feed under conditions sufficient to catalytically crack at least a portion of the hydrocarbon feed to form a product stream comprising a light olefin, where the light olefin selective catalyst is more selective than the catalyst in catalyzing formation of the light olefin by the catalytic cracking of the hydrocarbon feed.

BACKGROUND OF THE INVENTION

Light olefins such as ethylene, propylene, and butylene are important raw materials for multiple end products like polymers, rubbers, plastics, octane booster compounds, etc. It is expected that the demand for light olefins will continue to grow. Light olefins can be produced by catalytic cracking of hydrocarbons, e.g. petroleum based feed stocks such as naphtha. One issue facing current catalytic cracking processes is production of aromatic by products from secondary reactions occurring during the catalytic cracking process. The aromatics are formed at the expense of light olefins, and the aromatics formation can adversely impact the light olefins selectivity and yield of the catalytic cracking process.

BRIEF SUMMARY OF THE INVENTION

A discovery has been made that provides a solution to at least some of the aforementioned problems associated with catalytic cracking of hydrocarbons. In one aspect, the solution includes forming a light olefins selective catalyst from a catalyst and catalyzing cracking of hydrocarbon(s) using the light olefins selective catalyst. As illustrated in a non-limiting manner in the Examples, the light olefins selective catalyst of the present invention shows higher selectivity compared to the catalyst in catalyzing formation of light olefins by catalytic cracking of the hydrocarbon(s).

One aspect of the present invention is directed to a method for producing a light olefin. The method can include any one of, or both of steps (a)-(b). In step (a), a catalyst can be contacted with a coke precursor to form a light olefin selective catalyst. In step (b) the light olefin selective catalyst can be contacted with a hydrocarbon feed under conditions sufficient to catalytically crack at least a portion of the hydrocarbon feed to form a products stream containing a light olefin. The light olefin selective catalyst can be more selective than the catalyst in catalyzing formation of the light olefin over aromatics by the catalytic cracking of the hydrocarbon feed. In some aspects, the catalyst can contain a zeolite catalyst. The zeolite catalyst can have a MFI, FAU, MOR, Beta or Omega structure. In some aspects, the catalyst can contain a ZSM-5 zeolite, or a zeolite Y or both. In certain aspects, the zeolite Y can be an ultra-stable zeolite Y. The ZSM-5 zeolite can have a MFI structure (MFI-ZSM-5). In certain aspects, the zeolite Y, such as the ultra-stable zeolite Y. The zeolite-Y can have a FAU structure. In some aspects, the catalyst can contain an acidic ZSM-5 zeolite with modified pore structure. In some particular aspects, the catalyst can contain an acidic MFI-ZSM-5 zeolite with modified pore structure. In some aspects, the catalyst can contain H-ZSM-5 zeolite. In some aspects, the catalyst of the current invention is free of or sufficiently free of phosphorus. In some aspects, the catalyst of the current invention is free of or sufficiently free of a phosphorus modified zeolite catalyst. In some aspects, the coke precursor can contain a diene such as butadiene, an aromatic hydrocarbon, n-hexane, fuel oil, pyrolysis oil or any combination thereof. The catalyst and the coke precursor can be contacted at a temperature of 450° C. to 800° C., a pressure of 0.5 bar to 5 bar, a gas hourly space velocity (GHSV) of 1 $h^{-1}$ to 10 $h^{-1}$, or any combination thereof. The coke precursor can deposit coke on the catalyst to form the light olefin selective catalyst from the catalyst. In some aspects, the coke precursor can be a hard coke precursor and can deposit hard coke on the catalyst to form the light olefin selective catalyst. The hard coke can have low hydrogen content. In some aspects, the catalyst can contain less than 0.1 wt. % of coke. In some aspects, the light olefin selective catalyst can contain 0.1 wt. % to 2 wt. %, or greater than 0.5 wt. % to 2 wt. % of coke. In certain aspects, the catalyst and the coke precursor feed can be contacted at a catalyst to oil ratio of 3 to 40. The hydrocarbon feed can contain one or more hydrocarbons contained in naphtha and/or LPG. In some aspects, the hydrocarbon feed can be contained in naphtha and/or LPG. The coke precursor can be provided to step (a) comprised in a coke precursor stream. In certain aspects, the coke precursor stream can include a diluent. In some particular aspects, the diluent can be methane, steam, an inert gas, or any combination thereof. In some particular aspects, the inert gas can be $CO_2$ and/or $N_2$. In some particular aspects, the diluent can be $N_2$. In certain aspects, the coke precursor stream can include 50 wt. % to 100 wt. % or 50 wt. % to 97 wt. % of the coke precursor such as butadiene and/or n-hexane, and 0 wt. % to 50 wt. % or 3 wt. % to 50 wt. % of the diluent such as $N_2$. The catalytic cracking condition can include a temperature of 500° C. to 700° C., a pressure of 0.5 bar to 5 bar, a GHSV of 1 $h^{-1}$ to 10 $h^{-1}$, or any combination thereof. The light olefin produced can be ethylene, propylene, butylene, and/or any combination thereof. In certain aspects, the light olefin selective catalyst and the hydrocarbon feed can be contacted at a catalyst, e.g. light olefin selective catalyst to oil ratio of 3 to 40. In step (b) a spent catalyst can be formed from the light olefin selective catalyst. The spent catalyst can contain 0.1 wt. % to 5 wt. % coke. The wt. % of coke in the light olefin selective catalyst can be higher than the wt. % of coke in the catalyst. The wt. % of coke in the spent catalyst can be higher than the wt. % of coke in the light olefin selective catalyst. The spent catalyst can be regenerated and the regenerated catalyst formed from the spent catalyst can be recycled to step (a). The regeneration process can produce heat and at least a portion of the heat can be provided to step (a) and/or step (b). In certain aspects, the regeneration process can include contacting a regeneration stream containing oxygen ($O_2$) with the spent catalyst to form the regenerated catalyst. In some aspects, the regeneration stream can contain air, diluted air, and/or oxygen enriched air. In certain aspects, the regeneration process can include a temperature of 500° C. to 800° C., a pressure of 0.5 bar to 5 bar, a GHSV of 1 $h^{-1}$ to 10 $h^{-1}$, or any combination thereof.

The step (b) can be performed in a reactor, such as a riser reactor or a downer reactor. In some aspects, the step (a) can be performed in the reactor in which step (b) is performed, but at a position of the reactor upstream from the position at which step (b) is performed. In some particular aspects, the step (a) can be performed at a bottom position, e.g. first zone, of a riser reactor and the step (b) can be performed at a position, second zone above the first zone. The first zone of the riser reactor can be fluidly connected with the second zone of the riser reactor. In some particular aspects, the step (a) can be performed at a top position, first zone, of a downer reactor and step (b) can be performed at a position e.g. second zone, below the first zone. The first zone of the downer reactor can be fluidly connected with the second zone of the downer reactor. In certain aspects, step (a) can be performed in a reactor, e.g. first reactor, positioned upstream to the reactor, e.g. second reactor such as the riser reactor or downer reactor in which the step (b) is performed. The first reactor and the second reactor can be fluidly connected. Contact time of the catalyst and the coke precursor in the first reactor can be same or different than the contact time of the light olefin selective catalyst and the hydrocarbon feed in the second reactor. In some aspects, contact time in the first reactor can be 1 to 10 second. In some aspects, contact time of the light olefin selective catalyst and the hydrocarbon feed in the second reactor, such as the riser reactor or the downer reactor can be 1 to 10 second. In some aspects, step (a) and (b) can be performed in the same reactor and contact time of the catalyst and the coke precursor can be 1 to 10 second and the light olefin selective catalyst and the hydrocarbon feed in the reactor, such as the riser reactor or the downer reactor can be 1 to 10 second.

One aspect of the present invention is directed to a system for producing a light olefin. The system can include a first reactor and a second reactor. The first reactor can be configured to receive a catalyst and a coke precursor, contact the catalyst and the coke precursor under conditions sufficient to form a light olefin selective catalyst. The second reactor can be operatively connected to the first reactor and can be arranged downstream to the first reactor. The second reactor can be configured to receive the light olefin selective catalyst from the first reactor and a hydrocarbon feed, and contact the light olefin selective catalyst and the hydrocarbon feed under conditions sufficient to catalytically crack at least a portion of the hydrocarbon feed to form a spent catalyst and a products stream comprising a light olefin. In some aspects, the second reactor can be a riser or a downer reactor and the first reactor can be a reactor positioned upstream to the riser or downer. In certain aspects, the system can further include a regenerator, configured to receive the spent catalyst from the second reactor and a regeneration stream containing oxygen, contact the spent catalyst and the regeneration stream to regenerate the catalyst from the spent catalyst and provide the regenerated catalyst to the first reactor.

The following includes definitions of various terms and phrases used throughout this specification.

Cn hydrocarbon(s) refers to one or more hydrocarbon(s) containing molecules having n carbon atom(s). $C_n+$ hydrocarbon(s) refers to one or more hydrocarbon(s) containing molecules having n or more carbon atom(s). For example, $C_1$ hydrocarbon refers to methane. For example, non-limiting examples of $C_2+$ hydrocarbon includes ethane, propane, butane etc.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

A discovery has been made that provides a solution to at least some of the aforementioned problems associated with catalytic cracking of hydrocarbons. In one aspect, the solution includes forming a light olefin selective catalyst from a catalyst, e.g. cracking catalyst, prior to contacting the catalyst with the cracking feed. The light olefin selective catalyst can be formed by partial coke formation, e.g. 0.1 wt. % to 2 wt. % coke formation on the catalyst. It was found that the light olefin selective catalyst is more selective than the catalyst in catalyzing formation of light olefins over aromatics. During catalytic cracking of hydrocarbons, aromatic byproducts are formed by secondary reactions such as hydrogen transfer reactions. While not wishing to be bound by theory, it is believed that cracking catalysts such as zeolite catalysts can have multiple catalytic sites. Partial coke formation can preferentially suppress, e.g. deactivate, some of the catalytic sites that have relatively high activity towards secondary reactions such as hydrogen transfer reactions and formation of aromatics.

These and other non-limiting aspects of the present invention are discussed in further detail in the following sections with reference to the figures.

Figure 1A:
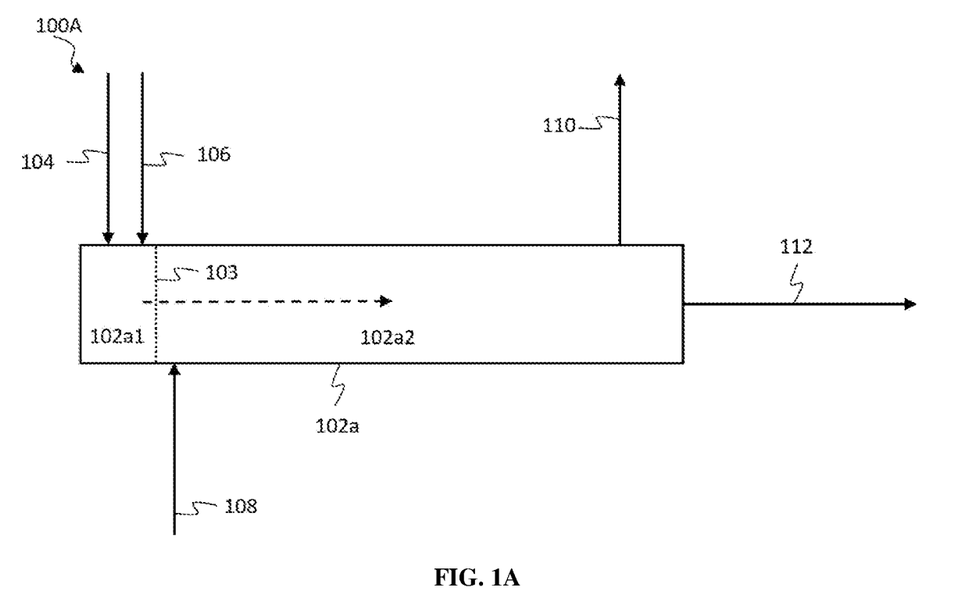
FIGS. 1A and 1B are schematics of an example of the present invention to produce light olefins. A) In one embodiment, the catalyst and the coke precursor are directly fed to the cracking unit. B) In a second embodiment, the catalyst and the coke precursor are contacted in a reactor upstream to the cracking unit to form a light olefin selective catalyst and the light olefin selective catalyst is fed to the cracking unit.
Figure 1B:
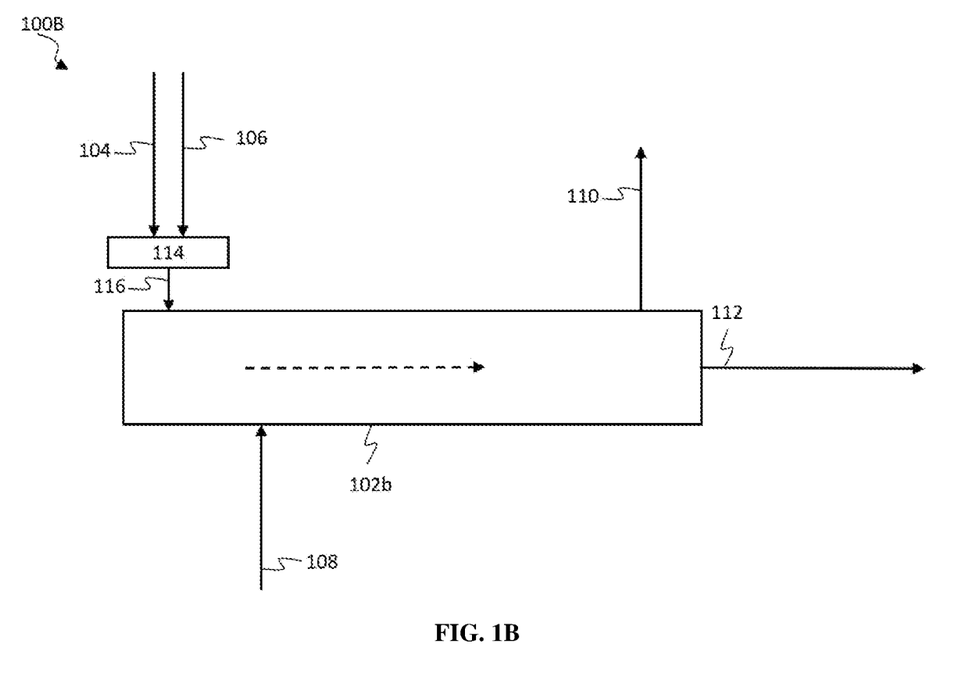

Referring to FIG. 1, systems and methods for producing light olefins according to one example of the present invention are described. In one embodiment, the system 100A (FIG. 1A) can include a cracking unit 102a. A coke precursor stream 104 containing a coke precursor can be fed to the cracking unit 102a. A catalyst stream 106 containing a catalyst, e.g. fluidized catalyst, can be fed to the cracking unit 102a. In some aspects, the coke precursor stream 104 and the catalyst stream 106 can be fed to the cracking unit 102a as separate feeds. In some aspects, the coke precursor stream 104 and the catalyst stream 106 can be combined and fed to the cracking unit 102a as a combined stream (not shown). The coke precursor stream 104 and the catalyst stream 106 can be fed to the cracking unit 102a at a first zone 102a1. In the cracking unit 102a, at zone 102a1, the catalyst and the coke precursor can be contacted to form a light olefin selective catalyst. A reactant stream 108 containing a hydrocarbon feed can be fed to the cracking unit 102a at a second zone 102a2. The light olefin selective catalyst formed in zone 102a1 can flow to zone 102a2. The second zone 102a2 can be positioned downstream to zone 102a1. The zones 102a1 and 102a2 can be in fluid communication. The boundary 103 between the zones can be an operational not a physical boundary and can change position depending on the conditions such as operational conditions and/or reaction conditions in the cracking unit 102a. In the cracking unit 102a, at zone 102a2, the light olefin selective catalyst can catalyze cracking of the hydrocarbon feed to produce light olefins, and a spent catalyst can be formed from the light olefin selective catalyst. The spent catalyst and light olefins can be separated to form a products stream 112 containing the light olefins and a stream 110 containing the spent catalyst. In some aspects, the light olefins and the spent catalyst can be separated in a stripper such as a cyclone separator. The stream 110 can be sent to a regenerator (not shown). The products stream 112 can be subjected to further process steps to obtain polymer grade light olefins (not shown). Referring to FIG. 1B, in this embodiment, the light olefin selective catalyst can be formed in a reactor positioned upstream to the cracking unit. The system 100B can include a cracking unit 102b and a first reactor 114 positioned upstream to the cracking unit 102b. The coke precursor stream 104 and the catalyst stream 106 can be fed to the first reactor 114 and in the first reactor 114 the catalyst and the coke precursor can be contacted to form the light olefin selective catalyst. A stream 116 containing the light olefin selective catalyst can be fed to the cracking unit 102b. The reactant stream 108 containing a hydrocarbon feed can be fed to the cracking unit 102b. In the cracking unit 102b, the light olefin selective catalyst can be contacted with the hydrocarbon feed to form the spent catalyst and light olefins. The spent catalyst and light olefins can be processed as described for System 100A. The overall flow direction of materials, such as the catalyst, light olefin selective catalyst, spent catalyst, cracking feed, e.g. the hydrocarbon feed, and/or cracking products, e.g. light olefins, in the cracking unit 102a/b is shown with the dotted arrow. The overall flow directions of the individual streams are shown with the respective arrows.

Figure 2A:
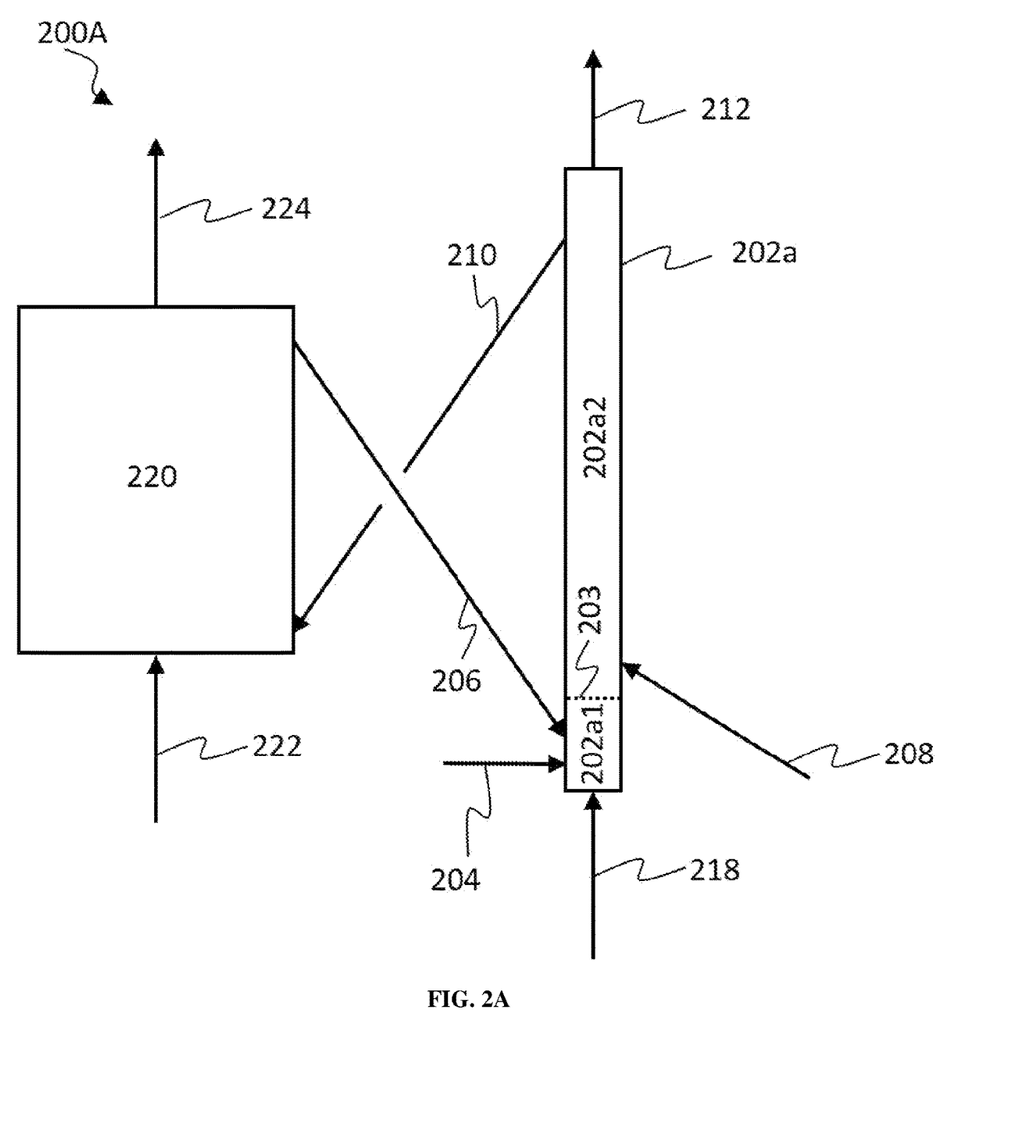
FIGS. 2A and 2B are schematics of a second example of the present invention to produce light olefins. A) In one embodiment, the catalyst and the coke precursor are directly fed to the riser. B) In a second embodiment, the catalyst and the coke precursor are contacted in a reactor upstream to the riser to form a light olefin selective catalyst and the light olefin selective catalyst is fed to the riser.
Figure 2B:
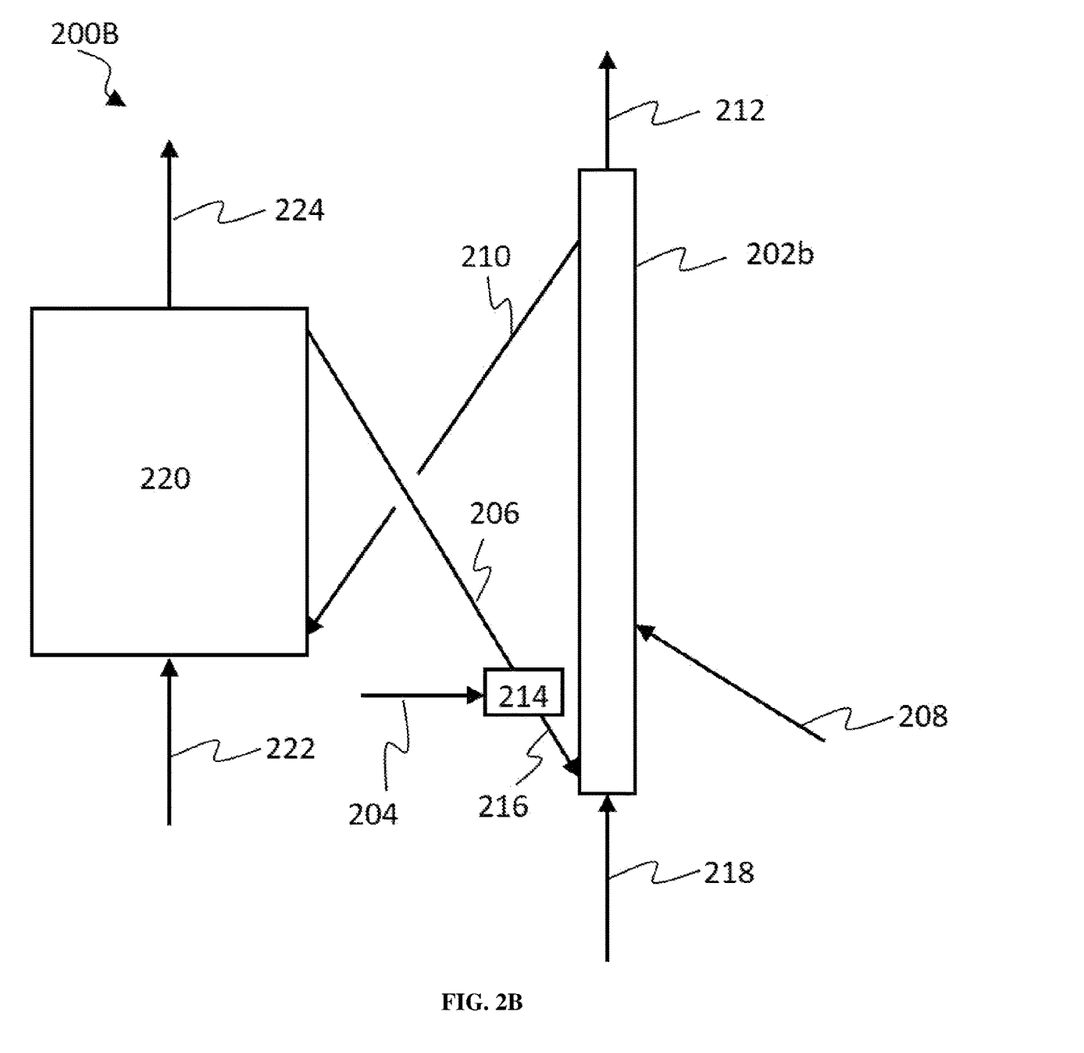

Referring to FIG. 2, systems and methods for producing light olefins according to a second example of the present invention is described. In one embodiment, the system 200A (FIG. 2A) can include a riser 202a and a regeneration unit 220. A coke precursor stream 204 containing a coke precursor can be fed to the riser 202a. A catalyst stream 206 containing a catalyst, e.g. fluidized catalyst, can be fed to the riser 202a. In some aspects, the coke precursor stream 204 and the catalyst stream 206 can be fed to the riser 202a as separate feeds. In some aspects, the coke precursor stream 204 and the catalyst stream 206 can be combined and fed to the riser 202a as a combined stream (not shown). The coke precursor stream 204 and the catalyst stream 206 can be fed to the riser 202a at a first zone 202a1. In the riser 202a, at zone 202a1, the catalyst and the coke precursor can be contacted to form a light olefin selective catalyst. A reactant stream 208 containing a hydrocarbon feed can be fed to the riser 202a at a second zone 202a2. The light olefin selective catalyst formed in zone 202a1 can flow to zone 202a2. The second zone 202a2 can be positioned downstream to, e.g., a position above the zone 202a1. The zones 202a1 and 202a2 can be in fluid communication. The boundary 203 between the zones can be an operational not a physical boundary and can change position depending on the conditions such as operational conditions and/or reaction conditions in the riser 202a. In the riser 202a, at zone 202a2, the light olefin selective catalyst can catalyze cracking of the hydrocarbon feed to produce light olefins, and a spent catalyst can be formed from the light olefin selective catalyst. The spent catalyst and light olefins can be separated to form a products stream 212 containing the light olefins and a stream 210 containing the spent catalyst. In some aspects, the light olefins and the spent catalyst can be separated in a stripper such as a cyclone separator. The products stream 212 can be subjected to further processing steps to obtain polymer grade light olefins (not shown). The stream 210 containing the spent catalyst can be fed to the regeneration unit 220. A regeneration stream 222 containing oxygen ($O_2$) can be fed to the regeneration unit 220. In the regeneration unit 220, the spent catalyst can be contacted with oxygen and the catalyst can be regenerated from the spent catalyst. The regenerated catalyst from the regeneration unit 220 can be recycled to the process via the stream 206. An effluent stream 224 containing carbon oxides resulting from catalyst regeneration process in the regeneration unit 224 can exit the regeneration unit 220. In some aspects, the effluent stream 224 can be sent to a CO boiler unit (not shown). Referring to FIG. 2B, in this embodiment, the light olefin selective catalyst can be formed in a reactor positioned upstream to the riser. The system 200B, can include a riser 202b, a first reactor 214 positioned upstream to the riser 202b and the regeneration unit 220. The coke precursor stream 204 and the catalyst stream 206 can be fed to the first reactor 214 and in the first reactor 214 the catalyst and the coke precursor can be contacted to form the light olefin selective catalyst. A stream 216 containing the light olefin selective catalyst can be fed to the riser 202b. The reactant stream 208 containing a hydrocarbon feed can be fed to the riser 202b. In the riser 202b, the light olefin selective catalyst can be contacted with the hydrocarbon feed to form the spent catalyst and light olefins. The spent catalyst and light olefins can be processed as described with respect to System 200A. A lift stream 218 containing steam can be fed to the riser 202a/b through a bottom portion of the riser 202a/b. The lift stream can lift the catalyst, light olefin selective catalyst, the spent catalyst, hydrocarbon feed and/or cracked products in the riser and can be used for controlling contact time in the riser.

Figure 3A:
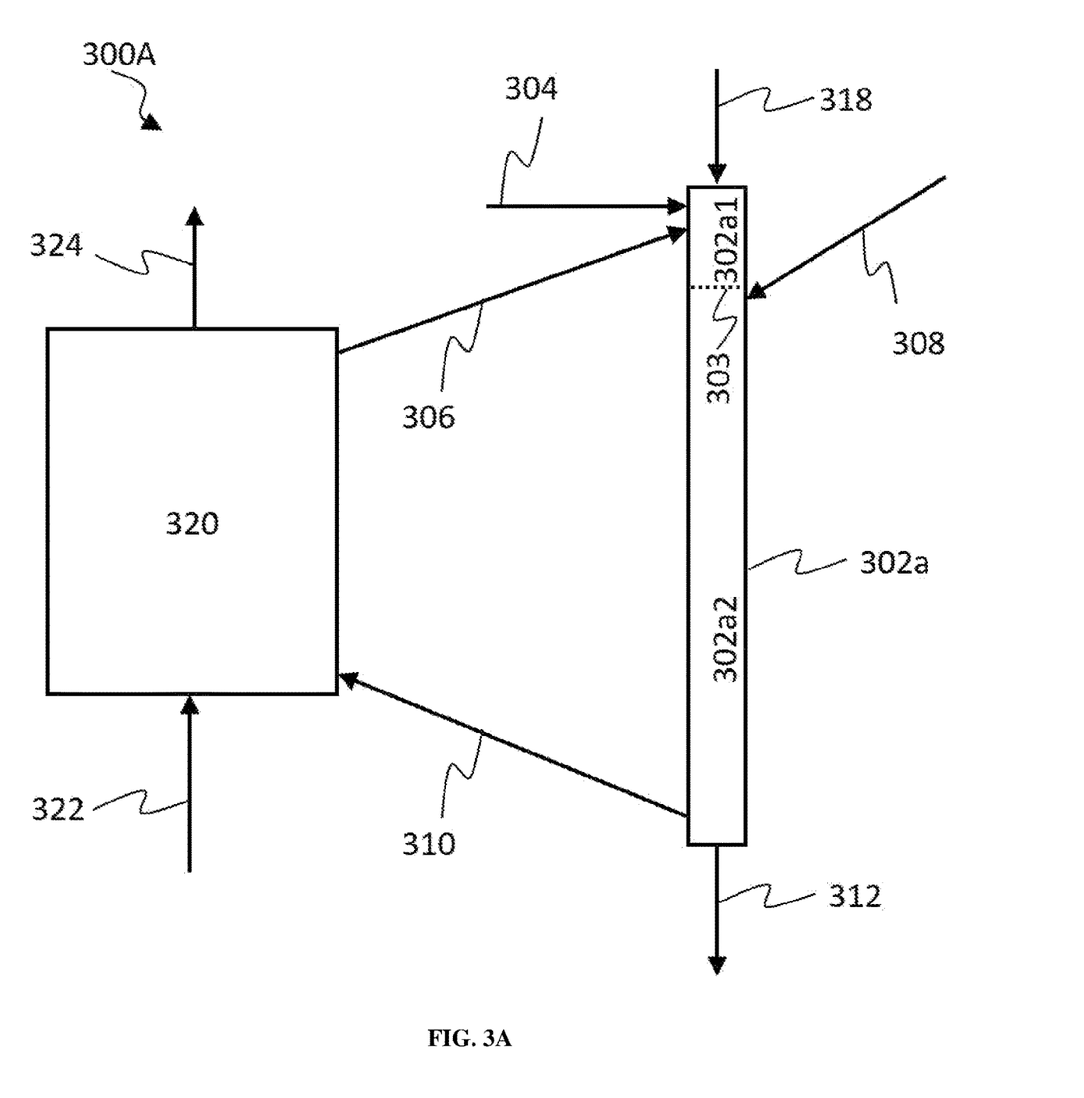
FIGS. 3A and 3B are schematics of a third example of the present invention to produce light olefins. A) In one embodiment, the catalyst and the coke precursor are directly fed to the downer. B) In a second embodiment, the catalyst and the coke precursor are contacted in a reactor upstream to the downer to form a light olefin selective catalyst and the light olefin selective catalyst is fed to the downer.
Figure 3B:
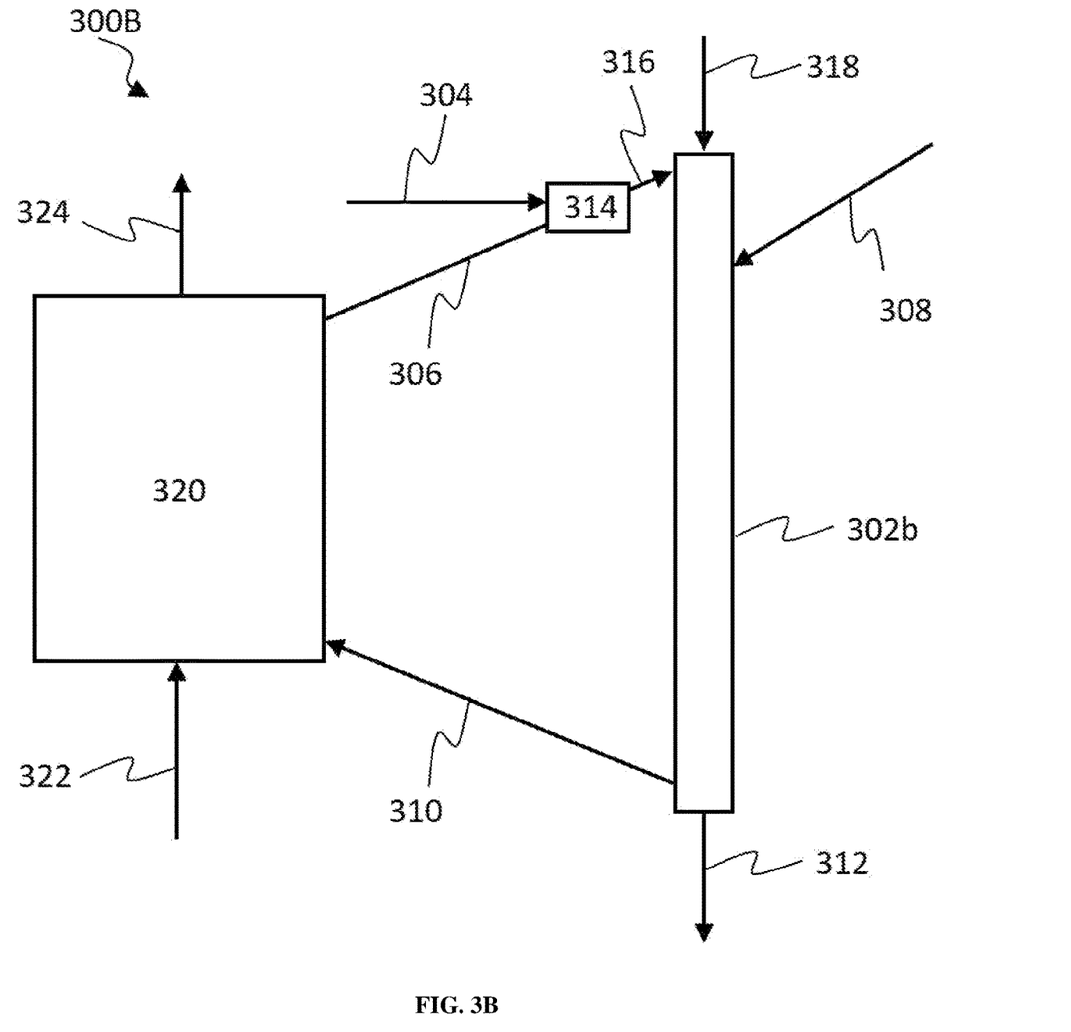

Referring to FIG. 3, systems and methods for producing light olefins according to one example of the present invention is described. In one embodiment, the system 300A (FIG. 3A) can include a downer 302a and a regeneration unit 320. A coke precursor stream 304 containing a coke precursor can be fed to the downer 302a. A catalyst stream 306 containing a catalyst e.g. fluidized catalyst can be fed to the downer 302a. In some aspects, the coke precursor stream 304 and the catalyst stream 306 can be fed to the downer 302a as separate feeds. In some aspects, the coke precursor stream 304 and the catalyst stream 306 can be combined and fed to the downer 302a as a combined stream (not shown). The coke precursor stream 304 and the catalyst stream 306 can be fed to the downer 302a at a first zone 302a1. In the downer 302a, at zone 302a1, the catalyst and the coke precursor can be contacted to form a light olefin selective catalyst. A reactant stream 308 containing a hydrocarbon feed can be fed to the downer 302a at a second zone 302a2. The light olefin selective catalyst formed in zone 302a1 can flow to zone 302a2. The second zone 302a2 can be positioned downstream to, e.g., a position below the zone 302a1. The zones 302a1 and 302a2 can be in fluid communication. The boundary 303 between the zones can be an operational not a physical boundary and can change position depending on the conditions such as operational conditions and/or reaction conditions in the downer 302a. In downer 302a, at zone 302a2, the light olefin selective catalyst can catalyze cracking of the hydrocarbon feed to produce light olefins, and a spent catalyst can be formed from the light olefin selective catalyst. The spent catalyst and light olefins can be separated to form a products stream 312 containing the light olefins and a stream 310 containing the spent catalyst. In some aspects, the light olefins and the spent catalyst can be separated in a stripper such as a cyclone separator. The products stream 312 can be subjected to further process steps to obtain polymer grade light olefins (not shown). The stream 310 containing the spent catalyst can be fed to the regeneration unit 320. A regeneration stream 322 containing oxygen ($O_2$) can be fed to the regeneration unit 320. In the regeneration unit 320, the spent catalyst can be contacted with oxygen and the catalyst can be regenerated from the spent catalyst. The regenerated catalyst from the regeneration unit 320 can be recycled to the process via the stream 306. An effluent stream 324 containing carbon oxides resulting from the catalyst regeneration process in the regeneration unit 324 can exit the regeneration unit 320. In some aspects, the effluent stream 324 can be sent to a CO boiler unit (not shown). Referring to FIG. 3B, in this embodiment, the light olefin selective catalyst can be formed in a reactor positioned upstream to the downer. The system 300B can include a downer 302b, a first reactor 314 positioned upstream to the downer 302b, and the regeneration unit 320. The coke precursor stream 304 and the catalyst stream 306 can be fed to the first reactor 314 and in the first reactor 314 the catalyst and the coke precursor can be contacted to form the light olefin selective catalyst. A stream 316 containing the light olefin selective catalyst can be fed to the downer 302b. The reactant stream 308 containing a hydrocarbon feed can be fed to the downer 302b. In the downer 302b, the light olefin selective catalyst can be contacted with the hydrocarbon feed to form the spent catalyst and light olefins. The spent catalyst and light olefins can be processed as described with respect to System 300A. A downer stream 318 containing steam can be fed to the downer 302a/b through a top portion of the downer 302a/b. The downer stream can aid downward flow of the catalyst, light olefin selective catalyst, the spent catalyst, hydrocarbon feed and/or cracked products in the downer reactor and can be used for controlling contact time in the downer.

Referring FIGS. 1, 2, and 3 the contact time of the coke precursor and the catalyst, in the first reactor 114, 214, 314 can be same or different than the contact time of the hydrocarbon feed and the light olefin selective catalyst in reactor 102b, 202b, 302b respectively. By providing the first reactor 114, 214, 314 the contact time for the step of forming the light olefin selective catalyst, can be independently controlled of the contact time for the step of catalytic cracking. In some aspects, the contact time of the catalyst and the coke precursor in the first reactor 114, 214, 314 can be 1 to 10 seconds, or at least any one of, equal to any one of, or between any two of 1, 2, 3, 4, 5, 6, 7, 8, 9 and 10 seconds. In some aspects, the contact time of the light olefin selective catalyst and the hydrocarbon feed in the reactors 102b, 202b, 302b can be 1 to 10 seconds, or at least any one of, equal to any one of, or between any two of 1, 2, 3, 4, 5, 6, 7, 8, 9 and 10 seconds. In some aspects, the contact time of the catalyst and the coke precursor in the reactors 102a, 202a, 302a can be 1 to 10 seconds, or at least any one of, equal to any one of, or between any two of 1, 2, 3, 4, 5, 6, 7, 8, 9 and 10 seconds. In some aspects, the contact time of the light olefin selective catalyst and the hydrocarbon feed in the reactors 102a, 202a, 302a can be 1 to 10 seconds, or at least any one of, equal to any one of, or between any two of 1, 2, 3, 4, 5, 6, 7, 8, 9 and 10 seconds The coke precursor stream 104, 204, 304 can contain a coke precursor. In some aspects, the coke precursor can contain a diene, an aromatic hydrocarbon, n-hexane, a fuel oil, pyrolysis oil or any combination thereof. In some particular aspects, the coke precursor diene can be butadiene. In some particular aspects, the coke precursor can be butadiene. In some particular aspects, the coke precursor aromatic hydrocarbon can be a mononuclear aromatic hydrocarbon such as benzene, and/or a polycyclic aromatic hydrocarbon such as naphthalene. In some particular aspects, the coke precursor fuel oil can be a $C_9$+ hydrocarbon. In certain aspects, the coke precursor stream 104, 204, 304 can further contain a diluent. In some aspects, the diluent can be methane, steam, or an inert gas, or any combination thereof. In some particular aspects, the inert gas can be $CO_2$ and/or $N_2$. In some aspects, the diluent can be $N_2$. The coke precursor can form, e.g. deposit, coke on the catalyst to form the light olefin selective catalyst. The diluent in the coke precursor stream can disperse the coke precursors in the coke precursor stream and improve homogeneity of coke formed on the light olefin selective catalyst. In some aspects, the coke precursor stream can contain i) 50 wt. % to 97 wt. % or at least any one of, equal to any one of, or between any two of 50, 60, 70, 80, 90, and 97 wt. % a coke precursor such as butadiene and/or n-hexane, and/or ii) 3 wt. % to 50 wt. % or at least any one of, equal to any one of, or between any two of 3, 10, 20, 30, 40, and 50 wt. % of a diluent, such as nitrogen ($N_2$). In some aspects, the coke precursor stream 104, 204, 304 can be fed to zone 102a1, 202a1, 302a1 (FIG. 1A, FIG. 2A, FIG. 3A respectively) or to the first reactor 114, 214, 314 (FIG. 1B, FIG. 2B, FIG. 3B respectively) at a temperature of 450 to 800° C. or at least any one of, equal to any one of, or between any two of 500, 525, 550, 575, 600, 625, 650, 675, 700, 725, 750, 775, and 800° C.

The catalyst stream 106, 206, 306 can contain a fluidized catalyst. In some aspects, the catalyst can contain a zeolite catalyst. The zeolite catalyst can have a Si/Al atom ratio of 1 or higher, preferably 20 or higher. The zeolite catalyst can include micro pores. In some aspects, the zeolite catalyst can have modified pore structure and can include micro, meso, or large pores or a combination thereof. The zeolite catalyst can include pores of 20 Å to 1000 Å, or 20 Å to 500 Å or at least any one of, equal to any one of, or between any two of 20, 100, 200, 300, 400, 500, 600, 700, 800, 900 and 1000 Å. The zeolite catalyst can have a surface area of 50 m$^2$/g to 500 m$^2$/g or at least any one of, equal to any one of, or between any two of 50, 100, 150, 200, 250, 300, 350, 300, 350, and 500 m$^2$/g, preferably 200 m$^2$/g to 500 m$^2$/g. In certain aspects, the zeolite can be an acidic zeolite, for example, can include H+ group(s) or Lewis acid site(s) on the surface thereof. In some aspects, the zeolite catalyst can have a MFI, FAU, MOR, Beta or Omega structure. In some particular aspects, the zeolite catalyst can include structural and textural modifications, e.g. modifications of the above mentioned structures. Non limiting modifications of the zeolite catalyst include i) addition of metals such as transition metals via ion exchange and/or doping, ii) addition of oxides, such as oxides of Ti, Ga, Fe, W, B, Zr, and/or Mo, and/or iii) porosity modification using various acids or bases. In some aspects, the modifications of the zeolite catalyst does not include modifications with a phosphorus compound. In some aspects, the catalyst can contain a ZSM-5 zeolite, a zeolite Y, or both. In certain aspects, the zeolite Y can be an ultra-stable zeolite Y. The ZSM-5 zeolite can have a MFI structure (MFI-ZSM-5). In certain aspects, the zeolite Y, such as the ultra-stable zeolite Y. The zeolite Y can have a FAU structure. In some aspects, the catalyst can contain an acidic ZSM-5 zeolite with modified pore structure to include mesoporous structure. In some aspects, the acidic ZSM-5 zeolite with modified pore structure can include pores of 20 Å to 500 Å.

Coke can be deposited on the catalyst, by contact of the coke precursor and the catalyst, to form the light olefin selective catalyst from the catalyst. The contacting condition of the catalyst and coke precursor in the zone 102a1, 202a1, 302a1 (FIG. 1A, FIG. 2A, FIG. 3A respectively) or in the first reactor 114, 214, 314 (FIG. 1B, FIG. 2B, FIG. 3B respectively) can include a temperature of (i) 450 to 800° C. or at least any one of, equal to any one of, or between any two of 450, 475, 500, 525, 550, 575, 600, 625, 650, 675, 700, 725, 750, 775 and 800° C., (ii) a pressure of 0.5 bar to 5 bar or at least any one of, equal to any one of, or between any two of 0.5, 1, 2, 3, 4, and 5 bar, or (iii) a GHSV 1 h$^{-1}$ to 10 h$^{-1}$ or at least any one of, equal to any one of, or between any two of 1, 2, 3, 4, 5, 6, 7, 8, 9 and 10 h$^{-1}$, or any combination thereof. The catalyst and the coke precursor can be contacted at a catalyst to oil (w/w) ratio of 3 to 40 or at least any one of, equal to any one of, or between any two of 3, 5, 10, 15, 20, 25, 30, 35 and 40. The light olefin selective catalyst can contain 0.1 wt. % to 2 wt. % or at least any one of, equal to any one of, or between any two of 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, and 2 wt. % of coke.

The reactant stream 108, 208, 308 can contain naphtha and/or LPG, and the naphtha and/or the LPG can contain the hydrocarbon feed. In certain aspects, the naphtha can be light straight run naphtha, heavy naphtha, and/or full range naphtha. In some particular aspects, the light straight run naphtha can contain $C_5$ and/or $C_6$ hydrocarbons. In some particular aspects, the full range naphtha can contain $C_5$ to $C_{12}$ hydrocarbons. In certain aspects, the hydrocarbon feed can be one or more of a $C_5$ to $C_{12}$ hydrocarbon. The hydrocarbon feed can be contacted with the light olefin selective catalyst to form light olefins by catalytic cracking of the hydrocarbon feed, and a spent catalyst can be formed from the light olefin selective catalyst. The spent catalyst can contain 0.1 wt. % to 5 wt. % or at least any one of, equal to any one of, or between any two of 0.1, 0.5, 1, 1.5, 2, 2.5, 3, 3.5, 4, 4.5, and 5 wt. % of coke. The contacting condition of the light olefin selective catalyst and the hydrocarbon feed in the zone 102a2, 202a2, 302a2 (FIG. 1A, FIG. 2A, FIG. 3A respectively) or in 102b, 202b, 302b (FIG. 1B, FIG. 2B, FIG. 3B respectively) can include a temperature of (i) 500 to 700° C. or at least any one of, equal to any one of, or between any two of 500, 525, 550, 575, 600, 625, 650, 675, and 700° C., (ii) a pressure of 0.5 bar to 5 bar or at least any one of, equal to any one of, or between any two of 0.5, 1, 2, 3, 4, and 5 bar, or (iii) a GHSV 1 h$^{-1}$ to 10 h$^{-1}$ or at least any one of, equal to any one of, or between any two of 1, 2, 3, 4, 5, 6, 7, 8, 9 and 10 h$^{-1}$, or any combination thereof. The light olefin selective catalyst and the hydrocarbon feed can be contacted at a catalyst e.g. light olefin selective catalyst to oil (w/w) ratio of 3 to 40, or at least any one of, equal to any one of, or between any two of 3, 4, 6, 8, 10, 12, 14, 16, 18, 20, 22, 24, 26, 28, 30, 32, 34, 36, 38 and 40. In some aspects, the total selectivity of the light olefins produced, such as total selectivity of ethylene, propylene and butylene produced from catalytic cracking of the hydrocarbon feed can be 20 to 70%.

In the regeneration unit 220, 320 the regeneration stream 222, 322 and the spent catalyst stream 210, 310 can be contacted at (i) a temperature of 500 to 800° C. or at least any one of, equal to any one of, or between any two of 500, 525, 550, 575, 600, 625, 650, 675, 700, 725, 750, 775, and 800° C., (ii) a pressure of 0.5 bar to 5 bar or at least any one of, equal to any one of, or between any two of 0.5, 1, 2, 3, 4, and 5 bar, or (iii) a GHSV 1 h$^{-1}$ to 10 h$^{-1}$, or at least any one of, equal to any one of, or between any two of 1, 2, 3, 4, 5, 6, 7, 8, 9 and 10 h$^{-1}$, or any combination thereof to regenerate the catalyst. In some aspects, the regeneration stream 222, 322 can contain 18 vol. % to 30 vol. % or 20 vol. % to 25 vol. % $O_2$. In some aspects, the regeneration stream can contain air, diluted air, and/or oxygen enriched air.

The light olefins can be ethylene, propylene and/or butylene. The products stream 112, 212, 312 can contain light olefins such as ethylene, propylene and/or butylene.

The units shown in FIGS. 1-3 can include one or more heating and/or cooling devices (e.g., insulation, electrical heaters, jacketed heat exchangers in the wall) or controllers (e.g., computers, flow valves, automated valves, etc.) that can be used to control temperatures and pressures of the processes. While only one unit is usually shown, it should be understood that multiple units can be housed in one unit. The systems and processes described herein can also include various equipment that is not shown and is known to one of skill in the art of chemical processing. For example, some controllers, piping, computers, valves, pumps, heaters, thermocouples, pressure indicators, mixers, heat exchangers, and the like may not be shown. Although embodiments of the present invention have been described with reference to blocks of FIGS. 1-3 should be appreciated that operation of the present invention is not limited to the particular blocks and/or the particular order of the blocks illustrated in FIGS. 1-3. Accordingly, embodiments of the invention may provide functionality as described herein using various blocks in a sequence different than that of FIGS. 1-3. Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

EXAMPLES

The present invention will be described in greater detail by way of specific examples. The following examples are offered for illustrative purposes only and are not intended to limit the invention in any manner. Those of skill in the art will readily recognize a variety of non-critical parameters that can be changed or modified to yield essentially the same results.

Example 1

P Catalytic Cracking of n-Hexane at 550° C., Coke Precursor Introduced at 480° C.

In a comparative experiment, comparative experiment A, a fresh acidic form of ZSM-5 catalyst with modified pore structure was placed in a reactor and was heated up under Ar flow. After reaching the desired temperature (550° C.) the catalyst activity was tested at different contact time with n-Hexane as feed. N-Hexane was injected directly to the reactor at atmospheric pressure. The targeted catalyst to oil w/w (C/O) ratio was equal to 10. After each test, the setup was flushed with Ar at 300° C. until no hydrocarbons were detected.

In experiment 1, according to an example of the current invention, acidic form of ZSM-5 catalyst with modified pore structure was brought into a contact with a hard coke precursor (n-Hexane) at 480° C. for 8 s. Immediately after this step the temperature was increased to 650° C. to generate coke to partially block the catalyst's active centers. The modified catalyst activity was tested using the above described procedure at 550° C. with n-Hexane at different contact time and C/O~10.

TABLE 1

Selectivity of the products obtained.

|  | Comparative Experiment A | Experiment 1 |
| --- | --- | --- |
| Selectively Coked | No | Yes |
| Temperature (° C.) | 550 | 550 |
| Contact time (s) | 7.0 | 7.0 |
| Conversion (%) | 10.0 | 8.8 |
| Selectivity |  |  |
| $H_2$ | 0.2 | 0.2 |
| Methane | 0.4 | 0.4 |
| Ethylene | 0.5 | 0.5 |
| Ethane | 0.3 | 0.3 |
| Propylene | 0.5 | 0.5 |
| Propane | 0.3 | 0.2 |
| Propylene/Propane | 2.0 | 3.0 |
| Butylene | 0.2 | 0.2 |
| Butane | 0.1 | 0.0 |
| Aromatics | 0.017 | 0.006 |
| Olefins/Paraffins | 1.3 | 1.5 |

Selectivity of the cracking products obtained from comparative experiment A and experiment 1 is shown in Table 1. It can be seen that the selectivity of the olefins is higher for experiment 1 compared to the comparative experiment A.

Example 2

Catalytic Cracking of n-Hexane at 550° C., Coke Precursor Introduced at 550° C.

In a comparative experiment, comparative experiment B, a fresh acidic form of ZSM-5 catalyst with modified pore structure was placed in a reactor and heated up under Ar flow. After reaching the desired temperature (550° C.) the catalyst activity was tested at different contact time with n-Hexane as feed. N-Hexane was injected directly to the reactor at atmospheric pressure. The targeted C/O ratio was equal to 10. After each test, the setup was flushed with Ar at 300° C. until no hydrocarbons were detected.

In experiment 2, according to an example of the current invention, acidic form of ZSM-5 catalysts with modified pore structure, was brought into a contact with a hard coke precursor (n-Hexane) at 550° C. for 8 s. Immediately after this step the temperature was increased to 650° C. to generate coke to partially block the catalyst's active centers. The modified catalyst activity was tested using the above described procedure at 550° C. with n-Hexane at different contact time and C/O~10.

TABLE 2

Selectivity of the catalytic cracking products obtained.

|  | Comparative Experiment B | Experiment 2 |
| --- | --- | --- |
| Selectively Coked | No | Yes |
| Temperature (° C.) | 550 | 550 |
| Contact time (s) | 9.0 | 11.0 |
| Conversion (%) | 12.0 | 12.2 |
| Selectivity |  |  |
| $H_2$ | 0.2 | 0.4 |
| Methane | 0.4 | 0.4 |
| Ethylene | 0.5 | 0.5 |
| Ethane | 0.3 | 0.3 |
| Propylene | 0.5 | 0.5 |
| Propane | 0.3 | 0.2 |
| Propylene/Propane | 1.9 | 2.6 |
| Butylene | 0.2 | 0.2 |
| Butane | 0.1 | 0.0 |
| Aromatics | 0.023 | 0.007 |
| Olefins/Paraffins | 1.3 | 1.4 |

Selectivity of the cracking products obtained from the comparative experiment B and experiment 2 is shown in Table 2. It can be seen that the selectivity of the olefins are higher for experiment 2 compared to the comparative experiment B.

Example 3

Catalytic Cracking with Multiple Regeneration Steps

In comparative experiment C, a fresh acidic form of ZSM-5 catalyst with modified pore structure was placed in a reactor and heated up under Ar flow. After reaching the desired temperature (550° C.) the catalyst activity was tested at different contact time with n-Hexane as feed. N-Hexane was injected directly to the reactor at atmospheric pressure. The targeted C/O ratio was equal to 10. After each test, the setup was flushed with Ar at 300° C. until no hydrocarbons were detected. After the described measurement series, the catalyst was regenerated under air flow at 550° C. for 3 h and the process was repeated thrice.

In experiment 3, according to an example of the current invention, acidic form of ZSM-5 catalyst with modified pore structure, was brought into a contact with a hard coke precursor (n-Hexane) at 480° C. for 8 s. Immediately after this step the temperature was increased to 650° C. to generate coke to partially block the catalyst's active centers. The modified catalyst activity was tested using the above described procedure at 550° C. with n-Hexane at different contact time and C/O~10. After the described measurement series, the catalyst was regenerated under air flow at 550° C. for 3 h and process was repeated thrice.

Selectivity of the cracking products obtained from the three cycles of the comparative experiment C and experiment 3 are shown in Table 3. It can be seen that for each cycle the selectivity of olefins are higher for experiment 3 compared to the comparative experiment C.

TABLE 3

Selectivity of the catalytic cracking products obtained.

|  | Comparative Experiment C Cycle 1 | Experiment 3 Cycle 1 | Comparative Experiment C Cycle 2 | Experiment 3 Cycle 2 | Comparative Experiment C Cycle 3 | Experiment 3 Cycle 3 |
| --- | --- | --- | --- | --- | --- | --- |
| Selectively Coked | No | Yes | No | Yes | No | Yes |
| Temperature (° C.) | 460 | 460 | 460 | 460 | 520 | 520 |
| Contact time (s) | 5.0 | 5.0 | 7.0 | 7.0 | 5.0 | 5.0 |
| Conversion (%) | 4.1 | 2.0 | 6.7 | 2.8 | 5.1 | 3.6 |
| Selectivity |  |  |  |  |  |  |
| $H_2$ | 0.3 | 0.1 | 0.2 | 0.1 | 0.4 | 0.3 |
| Methane | 0.0 | 0.1 | 0.0 | 0.1 | 0.1 | 0.3 |
| Ethylene | 0.2 | 0.2 | 0.2 | 0.2 | 0.3 | 0.4 |
| Ethane | 0.1 | 0.1 | 0.1 | 0.1 | 0.2 | 0.2 |
| Propylene | 0.3 | 0.3 | 0.3 | 0.4 | 0.4 | 0.5 |
| Propane | 0.6 | 0.3 | 0.7 | 0.5 | 0.5 | 0.3 |
| Propylene/Propane | 0.4 | 1.0 | 0.4 | 0.7 | 0.7 | 1.9 |
| Butylene | 0.1 | 0.1 | 0.1 | 0.2 | 0.2 | 0.2 |
| Butane | 0.2 | 0.1 | 0.3 | 0.2 | 0.2 | 0.1 |
| Aromatics | 0.026 | 0.002 | 0.034 | 0.006 | 0.028 | 0.004 |
| Olefins/Paraffins | 0.6 | 1.1 | 0.5 | 0.9 | 0.9 | 1.4 |

In the context of the present invention, at least the following 20 embodiments are disclosed. Embodiment 1 is a method for producing a light olefin. The method includes: (a) contacting a catalyst with a coke precursor containing a diene, an aromatic hydrocarbon, n-hexane, a fuel oil, or any combination thereof to form a light olefin selective catalyst, and (b) contacting the light olefin selective catalyst with a hydrocarbon feed under conditions sufficient to catalytically crack at least a portion of the hydrocarbon feed to form a products stream containing a light olefin, wherein the light olefin selective catalyst is more selective than the catalyst, in catalyzing formation of the light olefin by the catalytic cracking of the hydrocarbon feed. Embodiment 2 is the method of embodiment 1, wherein the catalyst includes a zeolite catalyst. Embodiment 3 is the method of embodiment 2, wherein the zeolite catalyst has a MFI, FAU, MOR, Beta or Omega structure. Embodiment 4 is the method of any one of embodiments 1 to 3, wherein the catalyst includes a ZSM-5 zeolite, and/or a zeolite Y. Embodiment 5 is the method of any one of embodiments 1 to 4, wherein the catalyst includes an acidic ZSM-5 zeolite with modified pore structure. Embodiment 6 is the method of any one of embodiments 1 to 5, wherein the coke precursor is butadiene. Embodiment 7 is the method of any of embodiments 1 to 6, wherein the catalyst and the coke precursor is contacted at a temperature of 450° C. to 800° C., a pressure of 0.5 bar to 5 bar, GHSV of 1 $h^{-1}$ to 10 $h^{-1}$, or any combination thereof. Embodiment 8 is the method of any one of embodiments 1 to 7, wherein the light olefin selective catalyst contains 0.1 wt. % to 2 wt. % of coke. Embodiment 9 is the method of any one of embodiments 1 to 8, wherein a spent catalyst is formed from the light olefin selective catalyst in step (b) and the method includes regenerating the spent catalyst to form a regenerated catalyst. Embodiment 10 is the method of any one of embodiments 1 to 9, wherein the hydrocarbon feed contains naphtha, and/or liquid petroleum gas (LPG). Embodiment 11 is the method of any of embodiments 1 to 10, wherein the light olefin is ethylene, propylene, or butylene or any combination thereof. Embodiment 12 is the method of any one of embodiments 1 to 11, wherein the cracking condition includes a temperature of 500° C. to 700° C., a pressure of 0.5 bar to 5 bar, a GHSV of 1 $h^{-1}$ to 10 $h^{-1}$, or any combination thereof. Embodiment 13 is the method of any one of embodiments 1 to 12, wherein the coke precursor includes a coke precursor stream and the coke precursor stream further includes a diluent. Embodiment 14 is the method of embodiment 13, wherein the diluent is methane, steam, an inert gas, or any combination thereof. Embodiment 15 is the method of either of embodiments 13 or 14, wherein the coke precursor stream includes 50 wt. % to 97 wt. % of the coke precursor and 3 wt. % to 50 wt. % of the diluent. Embodiment 16 is the method of any of embodiments 1 to 15, wherein the catalyst to oil ratio in step (a) is 3 to 40 and in step (b) is 3 to 40. Embodiment 17 is the method of any of embodiments 1 to 16, wherein the step (b) is performed in a riser or a downer reactor. Embodiment 18 is the method of embodiment 17, wherein the step (a) is performed in a reactor positioned upstream to the riser or the downer reactor. Embodiment 19 is the method of embodiment 17, wherein the step (a) is performed in the riser or the downer reactor, at a position upstream to a position where the step (b) is performed in the riser or the downer reactor.

Embodiment 20 is a system for producing a light olefin. The system includes a first reactor configured to receive a catalyst and a coke precursor, contact the catalyst and the coke precursor under conditions sufficient to form a light olefin selective catalyst, and a second reactor operatively connected to the first reactor and arranged downstream to the first reactor configured to receive the light olefin selective catalyst from the first reactor and a hydrocarbon feed, and contact the light olefin selective catalyst and the hydrocarbon feed under conditions sufficient to catalytically crack at least a portion of the hydrocarbon feed to form a products stream containing a light olefin, wherein the light olefin selective catalyst is more selective than the catalyst, in catalyzing formation of the light olefin by the catalytic cracking of the hydrocarbon feed.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for producing a light olefin, the method comprising:
   (a) contacting a zeolite catalyst with a coke precursor comprising hexane, butadiene, or any combination thereof and forming a coke on the zeolite catalyst, to form a light olefin selective catalyst;
   (b) contacting the light olefin selective catalyst with a hydrocarbon feed under conditions sufficient to catalytically crack at least a portion of the hydrocarbon feed to form a products stream comprising a light olefin and a spent catalyst;
   (c) regenerating the spent catalyst to form a regenerated catalyst;
   (d) using at least a portion of the regenerated catalyst as at least a portion of the zeolite catalyst in step (a); and
   (e) repeating steps (a) to (d) at least two times, wherein the light olefin selective catalyst is more selective than the catalyst, in catalyzing formation of the light olefin by the catalytic cracking of the hydrocarbon feed;
   wherein the catalyst to oil ratio in step (a) is 3 to 40 and the catalyst to oil ratio in step (b) is 3 to 40.

2. The method of claim 1, wherein the zeolite catalyst has a MFI, FAU, MOR, Beta or Omega structure.

3. The method of claim 1, wherein the zeolite catalyst comprises a ZSM-5 zeolite, and/or a zeolite Y.

4. The method of claim 1, wherein the light olefin catalyst comprises an acidic ZSM-5 zeolite with a modified pore structure and a coke layer deposited on the light olefin catalyst.

5. The method of claim 1, wherein the coke precursor is butadiene.

6. The method of claim 1, wherein the zeolite catalyst and the coke precursor is contacted at a temperature of 450° C. to 800° C., a pressure of 0.5 bar to 5 bar, GHSV of 1 $h^{-1}$ to 10 $h^{-1}$, or any combination thereof.

7. The method of claim 1, wherein the light olefin selective catalyst comprises 0.1 wt. % to 2 wt. % coke.

8. The method of claim 1, wherein the hydrocarbon feed is comprised of naphtha, and/or liquid petroleum gas (LPG).

9. The method of claim 1, wherein the light olefin is ethylene propylene, butylene, or any combination thereof.

10. The method of claim 1, wherein the cracking condition comprises a temperature of 500° C. to 700° C., a pressure of 0.5 bar to 5 bar, a GHSV of 1 $h^{-1}$ to 10 $h^{-1}$, or any combination thereof.

11. The method of claim 1, wherein the coke precursor is comprised in a coke precursor stream and the coke precursor stream further comprise a diluent.

12. The method of claim 11, wherein the diluent is methane, steam, an inert gas, or any combination thereof.

13. The method of claim 1, wherein the catalyst to oil ratio in step (a) is 3 and in step (b) is 3.

14. The method of claim 1, wherein the step (b) is performed in a riser or a downer reactor.

15. The method of claim 14, wherein the step (a) is performed in a reactor positioned upstream to the riser or the downer reactor.

16. The method of claim 15, wherein the step (a) is performed in the riser or the downer reactor at a position upstream to a position where the step (b) is performed in the riser or the downer reactor.

17. The method of claim 11, wherein the coke precursor stream comprises 50 wt. % to 97 wt. % of the coke precursor and 3 wt. % to 50 wt. % of the diluent.

\* \* \* \* \*